United States Patent

Gathman

[15] 3,644,828

[45] Feb. 22, 1972

[54] DC HIGH-VOLTAGE FOLLOWER ELECTROMETER

[72] Inventor: Stuart G. Gathman, Cheverly, Md.

[73] Assignee: The United States of America as represented by the Secretary of the Navy

[22] Filed: May 19, 1970

[21] Appl. No.: 38,675

[52] U.S. Cl. ........................324/123 R, 324/72.5, 324/109
[51] Int. Cl. ..................G01r 1/30, G01r 31/02, G01r 29/22
[58] Field of Search ................324/123, 109, 72.5, 72, 99 R, 324/32; 330/28

[56] References Cited

UNITED STATES PATENTS

| | | | |
|---|---|---|---|
| 3,482,235 | 12/1969 | Johnson | 324/72 X |
| 2,739,286 | 3/1956 | Schede | 324/123 |
| 2,881,266 | 4/1959 | Miller | 324/123 X |
| 3,444,465 | 5/1969 | Teixeira | 324/72.5 |

*Primary Examiner*—Rudolph V. Rolinec
*Assistant Examiner*—Ernest F. Karlsen
*Attorney*—R. S. Sciascia, Arthur L. Branning and Sol Sheinbein

[57] ABSTRACT

A high-input impedance electrometer tube for measuring high-atmospheric electric potentials where the high-input impedance is provided by a guard voltage (equal to the atmospheric voltage measured) supplied by a charged capacitor capable of large positive and negative excursions.

3 Claims, 1 Drawing Figure

3,644,828
PATENTED FEB 22 1972
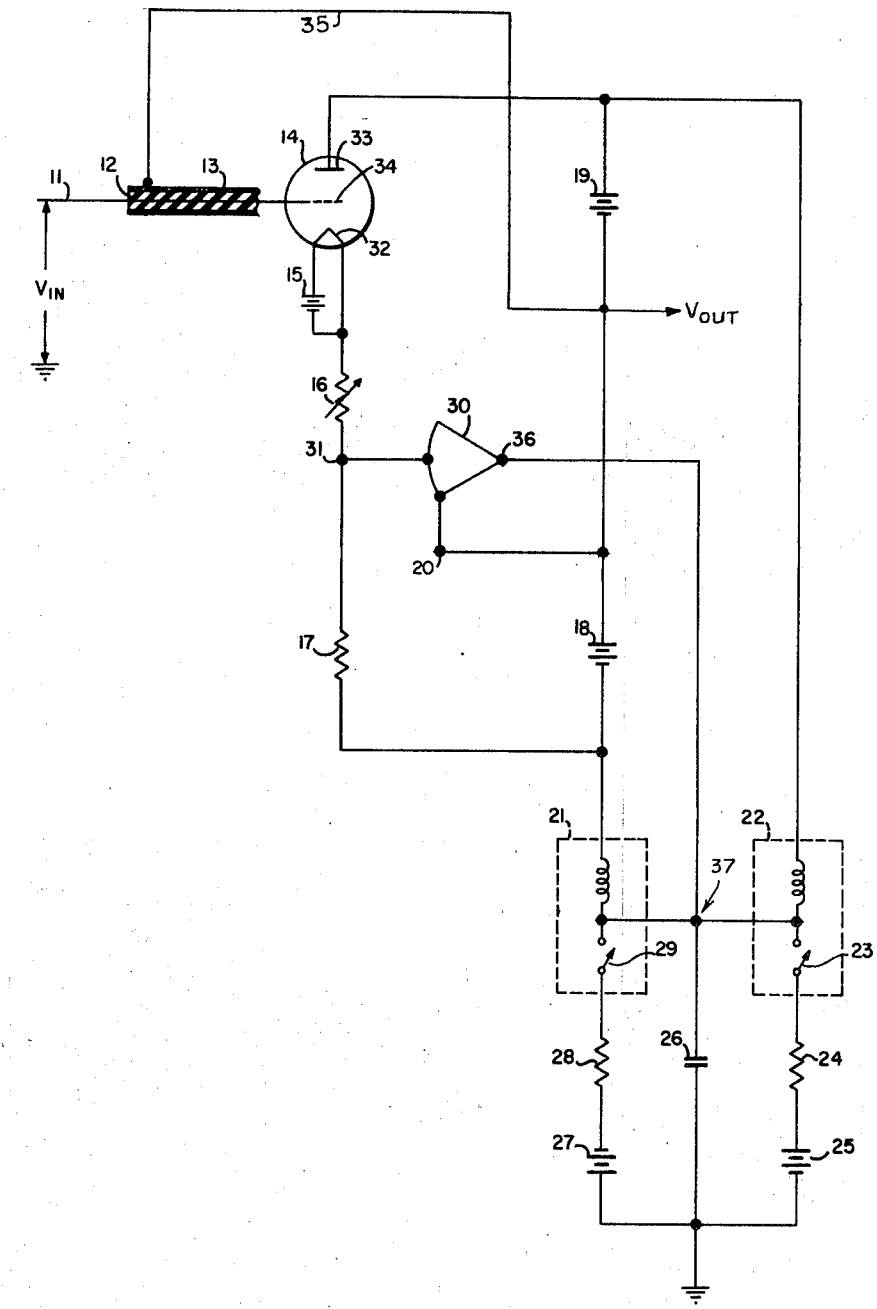
INVENTOR
STUART G. GATHMAN
BY Sol Sheinbein AGENT
Arthur I. Fiaming ATTORNEY

DC HIGH-VOLTAGE FOLLOWER ELECTROMETER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Atmospheric electrical measurements have been made predominantly over land since the days of Ben Franklin. Near the ocean surface two mechanisms are known to produce atmospheric space charge. They are the electrode effect and the bursting of air bubbles at the air-sea interface. The electrode effect is the result of the interaction of the geoelectric field with atmospheric ions to produce a region of positive charge over all types of water surfaces. Oceanic white water conditions indicate bursting bubbles which are the source of charged jet droplets expelled from the air-sea interface. Small evaporating jet droplets are entrained by air currents near the air-sea interface and transported aloft by various atmospheric mechanisms. Modern instruments are easily capable of measuring the atmospheric space charge with limiting sensitivities of the order of 50 to 100 elementary charges per cubic centimeter. Since the typical charge on the jet drops as they leave the ocean surface is in the order of 1,000 electronic charges, the instruments can distinguish the remains of one jet drop in about 10 cc. of air. Electrical measurements can thus be very sensitive detectors of jet drops. Sources of jet drops are easily distinguished in that they are associated primarily with white water patches on the air-sea interface. The transportation of these jet droplets from their sources of origin to a measurement platform is accomplished by atmospheric dispersion mechanisms. The best instrumental approach i the oceanic environment to the measurement of electric field is the potential gradient method. Here all that is to be measured is a voltage which ranges between 1 and 1,000 volts but at a very high source impedance and negligible grid current. The use of a radioactive element in the sensing antenna reduces the effective atmospheric impedance to about $5 \times 10^{10}$ ohms. Therefore the voltmeter must have an input impedance large only with respect to this number. Electronically this calls for an electrometer voltmeter but with a much wider range of voltages than is available commercially.

There are two ways of making this measurement. One is the voltage divider method, which requires high resistances in a dividing network. The accuracy of the measurement depends on the constancy of the input resistor and the integrity of the input insulator. These sources of error make the voltage divider undependable. The other approach is the use of an electrometer follower circuit where the low-impedance, high-voltage output is used as an insulator guard thereby effectively increasing the input impedance by a large amount. This approach holds the most promise for potential gradient measurements at sea.

The obvious device for the measurement of voltage with an extremely high input impedance and low grid current, while at the same time being moderately unsusceptible to high-voltage spikes, is the electrometer tube. Unfortunately, this device is limited in the voltage operating range that is required for electric potential measurements. Thus some means must be used to employ an electrometer tube cathode follower with the high operating voltages that are found in potential gradient measurements.

A voltage-sensitive device which will tolerate much larger output currents is necessary for long-term operation at sea because of the problem of salt spray short circuiting all unguarded insulators. A large bipolar voltage swing is also required to allow the device to follow the potential variations in the atmosphere during all types of weather. Even with the use of the good insulating materials such as Teflon the maintenance of these high impedances in the field becomes a large problem and a leak-free method of maintaining these impedances becomes imperative. This is done by applying a guard voltage equal to the input voltage but of lower impedance to the outside of the input insulator. With the large potentials in the atmosphere, a real problem exists in finding a device which can automatically give these high guard voltages and which can also cross zero volts to high negative voltages while using minimum amounts of battery power in remote locations.

The earliest method used to provide a guard voltage was described by Gish and Wait (1929) where they manually applied a guard voltage obtained from a potentiometer and a battery. Two stage feedback followers have been described by Brewer, "An electrometer Valve Voltmeter of Wide Range", Rev. Sci. Instr.30: 91–92 (1953), Crozier, "Measuring Atmospheric Potential With Passive Antennas", J. Geophs. Research 68: 5,173–5,179 (1963), and Krakauer, "Electrometer Triode Followers", Rev. Sci. Instr. 24: 495–500 (1953). These circuits, while effective, are limited to relatively small output currents (approximately 60 microamperes) and voltage excursions of ±600 volts because of excess voltages encountered in the tubes. Another problem encountered in these methods is that it is impractical for remote applications because of relatively high amounts of power needed to provide current through the tubes and also to run their heaters.

SUMMARY OF THE INVENTION

The present invention overcomes these drawbacks by use of a charged capacitor to provide the guard voltage equal to the input voltage needed for the maintenance of high input impedance. The charge on this capacitor and thus its voltage, is controlled by relays which, when activated, connect batteries to add either positive or negative charge to the capacitor whose voltage will then follow the input voltage.

OBJECTS OF THE INVENTION

It is therefore an object of this invention to provide a high voltage measuring device.

A further object of the present invention is to provide a high voltage measuring device having a high input impedance and low grid current.

A still further object of the present invention is to provide for a high voltage measuring device capable of measuring both positive and negative voltages while using a minimum amount of power.

Yet another object of the present invention is t provide for a device for measuring slowly varying input voltages.

Yet another object of the present invention is to provide for a measuring device capable of having a smooth transition from positive to negative values.

Yet another object of the present invention is to provide for a high input impedance electrometer.

A still further object of the present invention is to provide for an electrometer tube having a guard voltage that follows the atmospheric potentials being measured.

Further objects of the present invention will become apparent while reading the following description in connection with the drawing wherein:

The FIG. is a schematic diagram of the preferred embodiment of the invention.

DESCRIPTION OF THE PREFERRED EMBODIMENT

Referring now to the FIG., it will be noted that antenna 11 measures the atmospheric potential $V_{IN}$ with respect of ground. Teflon insulating coating 12 surrounds antenna 11, with metallic guard 13 encompassing Teflon coating 12. Antenna 11 is connected to the grid 34 of electrometer tube 14. Tube 14, preferably a 5886 electrometer type, has its filament 32 heated by battery 15 which is on the order of 1.5 volts. Also connected to electrometer tube filament 32 is zero adjust rheostat 16 which adjusts the voltage at terminal 31 to that of the input voltage. Anode 33 of electrometer 14 is connected to plate voltage supplies 19 and 18 which are in series and on the order of 12 volts each. The electrometer tube 14 is operated as a simple cathode follower by completing the circuit with resistor 17 between rheostat 16 and the negative terminal of supply voltage 18. Terminal 31, between rheostat 16 and resistor 17, is connected to the inverting terminal of operational amplifier 30 having another terminal connected to lead 35 from metallic guard 13. An output terminal 36 of operational amplifier 30 is connected to capacitor 26 and to relays 21 and 22. As is typical of an operational amplifier, the output 36 is able to produce positive or negative voltages to point 37, depending on the nature of the voltage differential between points 20 and 31. Relays 21 and 22 have their respective normally open switches 29 and 23 connected to voltage supplies 27 and 25, respectively, through limiting resistors 28 and 24. Relay switches 21 and 22 close at selected threshold voltages. Positive terminal of voltage supply 27 is grounded, as is the negative terminal of voltage supply 25 and one end of capacitor 26. Relay 21 is connected to resistor 17 and the negative terminal of battery 18, and relay 22 is connected to anode 33 of electrometer tube 14 and the positive terminal of battery 19. As can be seen from the drawing, batteries 18 and 19 serve two purposes; the first is to provide tube 14 with a proper supply voltage through resistor 17, and secondly to provide opposing currents through relays 21 and 22. An application of nodal current analysis between point 20 (an input to the operational amplifier) and point 37 quickly shows that a change in voltage polarity from output 36 with respect to point 20, determines whether the opposing currents from batteries 18 and 19 will either turn on relay 21 or 22. Voltage supplies, 25 and 27, may be batteries on the order of 300 volts, the limiting resistors 24 and 28 on the order of 400ohms and capacitor 26, $4\mu$ farads, 300 volts. Relays 21 and 22 may be reed relays or regular relays such as selected Potler and Brumfield PW 5LS which has a resistance of approximately 5K ohms. Voltage output $V_{out}$ is taken at terminal 20 connected to lead 35 and is of the same magnitude of $V_{IN}$ but is now measurable as a result of the substantially reduced impedance.

In explaining the operation of this circuit, it is apparent that with zero potential at $V_{IN}$, there is zero potential at input voltage terminal 31, terminal 36 (capacitor 26 uncharged) and thus a zero output at terminal 20, $V_{out}$. Thus, when the input potential $V_{IN}$ is zero, there is no grid current in electrometer tube 14 and the tube presents an infinite input impedance looking into the tube 14 from terminal 11. This high input impedance may be maintained over a substantial range of input voltages by supplying a voltage on guard 13 equal to that of the input voltage $V_{IN}$ measured by antenna 11. This is accomplished by operational amplifier 30 which maintains a voltage between terminals 20 and 36 such that terminals 20 (the antenna guard and output voltage terminal) and 31 (input voltage terminal) are kept very nearly the same voltage. In operation, if the input voltage $V_{IN}$ exceeds a threshold positive voltage, the voltage across operational amplifier 30 between terminals 20 and 36 in series with battery voltage 19 is sufficient to close switch 23 at relay 22 whereby battery 25 adds positive charge to capacitor 26 which in turn is connected to terminal 36 of operational amplifier 30. Charge builds up on capacitor 26 until such time as the voltage on the capacitor equals the input voltage at terminal 31. When the capacitor 26 voltage, at terminal 36, reaches the input voltage of terminal 31, the voltage across operational amplifier 30 between terminals 20 and 36 is small enough such that switch 23 of relay 22 opens. Similarly, a sufficiently high input negative voltage $V_{IN}$ causes switch 29 of relay 21 to close and add a negative charge on capacitor 26 through battery 27 until such time as the voltage across operational amplifier decreases and results in opening switch 29. In this way, the circuit maintains the voltage on capacitor 26, at terminal 36, to roughly the input voltage $V_{IN}$, of terminal 31, depending on the sensitivities of relays 21, 22. A precise guard voltage is obtained at terminal 20, and thus at metallic guard 13, because of the feedback of the operational amplifier 30. A modest current can be drawn from terminal 20 as a DC output signal. The speed of operation of the circuit is a function of the speed of the relays 21, 22 and of the ability of the high voltage batteries 27, 28 to supply current to the capacitor 26.

Obviously many modifications and variations are possible in light of the above teachings. It is therefore to be understood that within the scope of the appended claims the invention may be practiced otherwise than as specifically described.

What is claimed and desired to be secured by Letters Patent of the United States is:

1. Apparatus for providing a high guard voltage to a measuring device whereby a low current, high voltage may be measured by said measuring device, comprising:

an antenna for detecting a voltage;
a metallic guard around said antenna;
an electrometer tube amplifier means comprising an anode, grid and filament electrodes, said grid connected to said antenna;
operational amplifier means having a first input, a second input and an output,
means coupling the filament electrode of the electrometer tube amplifier means to the first input of the operational amplifier means,
capacitive means for storing a voltage level with respect to ground potential,
means for applying positive and negative voltages to said capacitor in response to the voltage differential appearing between the metallic guard and the voltage level at the output of the operational amplifier means,
means coupling the voltage level appearing on the capacitor to the metallic guard, and to the second input whereby the voltage at said second input of the operational amplifier means is approximately the same as the voltage at said first input of said operational amplifier means, and
output means connected to the metallic guard for supplying a measurable voltage.

2. Apparatus as recited in claim 1 wherein said supplying means comprises:

two voltages supplies, one of said voltage supplies having its negative terminal connected to said capacitor, the other of said voltage supplies having its positive terminals connected to said capacitor; and
two relays between said voltage supplies and capacitor having normally open switches;
whereby said relays charge said capacitor by closing their respective switches upon a predetermined voltage between said second input and said output of said operational amplifier and complete the connection of said voltage supplies to said capacitor.

3. Apparatus as recited in claim 2 including:

insulating material between said antenna and said metallic guard;
a filament battery for heating said filament;
two batteries connected to said tube anode; and
a rheostat connected to said tube filament for adjusting the voltage at said first input of said operational amplifier to the voltage on said antenna.

* * * * *